Patented Oct. 28, 1947

2,429,838

UNITED STATES PATENT OFFICE 2,429,838

SYNTHETIC RUBBERLIKE MATERIALS COMPRISING FLUOROPRENE

Walter E. Mochel, Wilmington, Del., assignor to E. I. du Pont de Nemours & Company, Wilmington, Del., a corporation of Delaware No Drawing. Application April 27, 1944, Serial No. 533,063

2 Claims. (Cl. 260—84.5)

1

This invention relates to the production of new synthetic rubber-like materials comprising fluoroprene (2-fluoro-1, 3-butadiene).

There is today an ever increasing demand for rubber-like materials which are characterized by high resistance to the swelling action of oils and other solvents. Polymers of chloroprene, and particularly the copolymers of chloroprene and acrylonitrile, have proved to be of great value where such elastomers are required, but there is a need for rubber-like materials which are not only highly resistant to the swelling action of oils and solvents, but which have the property of retaining their resiliency at even lower temperatures than characterize those now available. While chloroprene polymerizes readily and in high yields, it is known that the chloroprene-acrylonitrile mixtures are difficult to copolymerize in such a manner that all of the acrylonitrile is copolymerized with the chloroprene, so that the yields of such copolymers are low unless special procedures, such as more particularly disclosed in copending applications to Wagner, Serial Nos. 434,785 and 526,479, are employed.

It is therefore an object of this invention to produce synthetic rubber-like material comprising fluoroprene which will give resilient vulcanizates having high oil and freeze resistance.

I have found that, where mixtures consisting of from 80% to 97% of fluoroprene (2-fluoro-1, 3-butadiene) and from 20% to 3% of acrylonitrile are polymerized, rubber-like products having good resiliency are produced which have high oil and freeze resistance. I have also found that with fluoroprene, the acrylonitrile polymerizes readily so that relatively high yields of the fluoroprene-acrylonitrile of desired acrylonitrile content are obtained directly by the ordinary methods employed in polymerizing chloroprene.

In general, the new synthetic rubber-like materials of this invention are produced by dispersing a mixture of from 80% to 97% of fluoroprene and from 20% to 3% of acrylonitrile in an aqueous emulsion containing a catalyst of the persulfate or peroxide type, and effecting polymerization at temperatures preferably in the range of from 10° to 40° C. The resulting latex, after being stabilized with the usual antioxidants employed in the chloroprene rubbers such as phenyl-alpha-naphthylamine, is coagulated, and

2 the rubber-like coagulant is washed free of residual salts and dried. The resulting elastomer is then compounded, molded and vulcanized by the processes generally employed in the preparation of chloroprene rubbers.

The fluoroprene may be prepared by the vapor phase reaction of monovinyl acetylene with hydrogen fluoride, as more particularly described in my copending application Serial No. 508,242. The fluoroprene is preferably substantially free of monovinyl acetylene and boils over the range 11.8–12.0° C./760 mm. Furthermore, in purification the fluoroprene is preferably distilled in an oxygen-free atmosphere so that the product is essentially free of peroxides.

The following examples are given to illustrate the invention. The parts used are by weight.

Example 1

A mixture of 85 parts of fluoroprene and 15 parts of acrylonitrile is emulsified in 150 parts of an aqueous solution containing 4 parts of sodium oleate, 0.5 part of excess sodium hydroxide, 1 part of a formaldehyde/sodium naphthalenesulfonate condensation product, 1 part of potassium persulfate and 0.1 part of potassium ferricyanide. One and a quarter parts of lauryl mercaptan is added and the emulsion is heated for three hours at 30° C. in a sealed, glass-lined vessel equipped for efficient agitation. The resultant latex is treated with an antioxidant consisting of 2 parts of a phenyl - alpha - naphthylamine / diphenylamine (55:45) mixture dispersed in water. The stabilized latex is coagulated by means of brine and acetic acid, washed on a corrugated rubber mill to free it of residual salts and finally dried on a smooth mill at a temperature of approximately 60° C. The product consists of 95 parts of plastic, coherent, rubber-like material. The dry polymer is compounded according to the following tread stock formula:

| | Parts |
|---|---|
| Elastomer | 100 |
| Channel carbon black | 40 |
| Zinc oxide | 10 |
| Extra light calcined magnesia | 10 |
| Stearic acid | 1 |
| Phenyl-alpha-naphthylamine | 1 |
| Sulfur | 2 |

The compounded stock is pressed to the desired shape in a mold and cured for fifty minutes at 153° C. under pressure. The vulcanizate has a tensile strength of 4700 lbs./sq. in. at 540% elongation and shows good resilience as indicated by a Schopper rebound value of 40%, and high oil resistance, as indicated by only 21.4% volume increase after 2 days' immersion in kerosene at 100° C.

In the measurement of freeze resistance, a vulcanizate of uniform cross-section is stretched at least 170% and frozen by cooling slowly to −70° C. in this stretched condition. The tension on the sample is then released, the temperature is raised slowly, and the sample is allowed to contract freely. The temperature at which the sample shows 10% of the total retraction possible designated as the $T_{10}$ value, is an indication of the point at which the rubber begins to regain its elastic properties. Thus, the lower the $T_{10}$ value, the greater is the freeze resistance. Another means by which a measure of freeze resistance is obtained involves determining the temperature at which the Shore durometer hardness of a test specimen has increased to a value midway between the hardness at room temperature and 100 when the test specimen is cooled slowly. This temperature is designated as the $F_{50}$ value. The greatly increased freeze resistance and resilience of the 85:15 fluoroprene/acrylonitrile copolymer in comparison with the 85:15 chloroprene/acrylonitrile copolymer is illustrated in the following table.

| Test | Fluoroprene-Acrylonitrile | Chloroprene-Acrylonitrile |
|---|---|---|
| $T_{10}$ _____ ° C.. | −32 | −18 |
| $F_{50}$ _____ ° C.. | −30 | −10 |
| Schopper rebound _____ per cent.. | 40 | 16 |
| Kerosene Swell _____ do____ | 21 | 23 |

While polychloroprene shows high resilience (45% rebound) and compares favorably with the fluoroprene copolymer in freeze resistance, the fluoroprene copolymer has much improved oil resistance since it shows a volume increase of only 21.4% as compared to a 70% volume increase for chloroprene in kerosene under the same conditions.

The polymerization of fluoroprene alone under the conditions of Example 1 requires approximately six hours at 30° C. to reach the same high yield obtained in Example 1, so that with fluoroprene the presence of the acrylonitrile greatly accelerates the polymerization rate. This differs markedly from the case of chloroprene/acrylonitrile mixtures, which demand special conditions to give a uniform product in which the acrylonitrile employed is all utilized, and which are difficult to obtain in high yields.

Example 2

A mixture of 80 parts of fluoroprene and 20 parts of acrylonitrile, when polymerized by the procedure described above, yields 93 parts of a coherent, rubber-like product in three hours at 30° C. When compounded and cured as described above, it gives a vulcanizate which exhibits a tensile strength of 4830 lbs./sq. in. at 470% elongation, a $T_{10}$ value of −25.4° C., Schopper rebound of 33%, and only 15.3% swell after forty-eight hours' immersion in kerosene at 100° C.

Example 3

A mixture of 95 parts of fluoroprene and 5 parts of acrylonitrile is polymerized in an aqueous emulsion system similar to that described in Example 1 with the exception that only one part of lauryl mercaptan is used. After five hours at 30° C., a yield of 93 parts of a coherent rubber-like material is obtained.

This product may be compounded according to the following formula:

| | Parts |
|---|---|
| Elastomer | 100 |
| Channel carbon black | 40 |
| Stearic acid | 1 |
| Magnesium oxide | 10 |
| Zinc oxide | 10 |
| Sulfur | 2 |
| Di-ortho-tolylguanidine salt of dicatechol borate | 1 |

With such a formula the vulcanization proceeds more rapidly than with the formula used in the foregoing examples. After curing for thirty minutes at 153° C., a vulcanizate is obtained which exhibits a tensile strength of 3200 lbs./sq. in. at 340% elongation, with excellent freeze resistance ($T_{10}=-46°$ C.), and resilience (Schopper rebound=47%) essentially equivalent to that of natural rubber. This product swells less in kerosene (60%) than polychloroprene, and its freeze resistance in comparison is outstanding.

It is to be understood that the examples are illustrative only, and that any ratio of monomers within the limits of 80% to 97% of fluoroprene and 3% to 20% of acrylonitrile may be used. At least 3% of the acrylonitrile is required to obtain an appreciable improvement in oil resistance in comparison with polyfluoroprene, and in order to retain a high degree of freeze resistance and resilience not more than 20% of the nitrile is employed. The proportion of the acrylonitrile to be used will depend upon the particular properties desired in view of the application intended for the resulting rubber.

It is preferable in using fluoroprene prepared from hydrogen fluoride and monovinyl acetylene, that the monomer be essentially free of peroxides and acetylenic compounds, although attractive copolymers from somewhat less pure fluoroprene may be prepared by the proper adjustment of modifiers. Thus, if the fluoroprene contains an appreciable amount of monovinyl acetylene, the use of an increased proportion of sulfur containing modifier such as mercaptan in the polymerization system will tend to overcome the deleterious effects of the acetylenic compounds upon the properties of the rubber. While the examples illustrate only the preparation of copolymers of fluoroprene itself, i. e., 2-fluorobutadiene-1,3, it is understood that the invention is applicable, likewise, to polymerizable fluoroprene homologs such as 2-fluoro-3-ethylbutadiene-1,3, 2-fluoro-3-propylbutadiene-1,3, or 2-fluoro-3-methylbutadiene-1,3. Copolymers of the latter fluorobutadienes are, in general, less oil resistant and less freeze resistant than those of fluoroprene itself. Alpha-alkyl substituted acrylonitriles, such as methacrylonitrile, also may be employed in combination with fluoroprene to produce oil and freeze resistant rubbers. However, the substituted acrylonitriles result in rubbers of somewhat inferior oil resistance, and for this reason, as well as greater availability, acrylonitrile is preferred.

The monomer mixture may be polymerized in any convenient manner, but, generally, best results are obtained by using the emulsion polymerization technique. Although an alkaline sodium oleate system, as described in the examples, is generally preferred, it is possible to use other emulsifying agents in either alkaline or acid medium with satisfactory results. Thus, the alkali salts of naphthenic acids, long chain aliphatic sulfonic acids, or alkyl-naphthalenesulfonic acids are satisfactory. Betaines such as C-cetyl or N-hydroxypropyl-C-cetyl-betaine, and quaternary ammonium salts having long carbon chains, such as cetyl-trimethyl-ammonium bromide, may be employed. Combinations of emulsifying agents, such as the alkali salts of oleic acid and rosin, may also be employed to advantage.

As the polymerization catalyst, potassium persulfate is preferred, although other materials, such as hydrogen peroxide, benzoyl peroxide, or sodium perborate, may be used if desired. Catalyst activators, such as potassium ferricyanide or sodium hydrosulfite, used in conjunction with persulfates or peroxides, are especially beneficial by way of accelerating polymerization.

Polymerization modifiers, such as octyl, decyl, or lauryl (dodecyl) mercaptan, or crude mixtures of long chain aliphatic mercaptans, are preferably employed. However, other polymerization modifiers, such as dialkyl xanthogen disulfides or carbon tetrachloride, may be used if desired. It is possible to carry out these polymerizations under many diverse conditions in the presence of many different ingredients commonly used for the modification of haloprene or butadiene hydrocarbon polymerization systems.

The polymerization temperature may be varied within the limits of 5° C. to 80° C., temperatures of 20° to 40° C. being preferred. The time required to obtain high yields of the polymerizate will vary, of course, with the temperature, the catalyst, and the emulsion system employed.

The polymerized latex may be stabilized in any suitable manner, but the addition of a dispersion of an aromatic amine, such as phenyl-alpha-naphthylamine is preferred. The latex may be coagulated by alcohol, acids, and brine, or by heavy metal salts such as aluminum sulfate, or by freezing as described in U. S. Patent 2,187,146. The use of brine and an acid such as acetic or sulfuric acid is preferred for the coagulation of sodium oleate latices. Processing of the coagulum can be carried out by conventional means.

Polymerization products, prepared as described above, may be compounded in many different ways in order to obtain vulcanizates having different properties desired for specific uses. In general, the well known techniques of compounding rubber and butadiene copolymer rubbers with sulfur, a vulcanization accelerator and a metallic oxide, are applicable to these products. The compounded masses may then be molded, sheeted, calendered, or, in general, formed to the desired shape and vulcanized. The vulcanization may be carried out at room temperature or above, but preferably between 130° and 170° C.

The products of this invention are especially valuable in applications where resilient materials, which retain their rubber-like characteristics at low temperatures and in contact with oils or other chemicals, are required. Furthermore, they are particularly valuable for applications where ozone and sunlight resistance are required in addition to oil and freeze resistance. Specific applications requiring one or more of these properties are encountered in certain automobile and airplane parts, such as carburetor or fuel pump diaphragms and gaskets, motor mounts, gasoline hose, door seals, and the like.

I claim:

1. A synthetic rubber-like material having high oil and freeze resistance, being a copolymer of 2-fluoro-1,3-butadiene and acrylonitrile containing from 80% to 97% of 2-fluoro-1,3-butadiene and from 20% to 3% of acrylonitrile.

2. A synthetic rubber-like material having high oil and freeze resistance, being a copolymer of 2-fluoro-1,3-butadiene and acrylonitrile containing 85% of 2-fluoro-1,3-butadiene and 15% of acrylonitrile.

WALTER E. MOCHEL.

REFERENCES CITED

The following references are of record in the file of this patent:

UNITED STATES PATENTS

| Number | Name | Date |
|---|---|---|
| 2,066,331 | Carothers et al. | Jan. 5, 1937 |
| 1,950,431 | Carothers et al. | Mar. 13, 1934 |